US012583550B2

(12) United States Patent
Bernardi

(10) Patent No.: US 12,583,550 B2
(45) Date of Patent: Mar. 24, 2026

(54) TRYCICLE PEDAL VEHICLE

(71) Applicant: Claudio Bernardi, Piossasco (IT)

(72) Inventor: Claudio Bernardi, Piossasco (IT)

(*) Notice: Subject to any disclaimer, the term of this patent is extended or adjusted under 35 U.S.C. 154(b) by 620 days.

(21) Appl. No.: 17/994,361

(22) Filed: Nov. 27, 2022

(65) Prior Publication Data

US 2023/0257056 A1 Aug. 17, 2023

Related U.S. Application Data

(63) Continuation-in-part of application No. 16/981,987, filed on Sep. 17, 2020, now abandoned.

(51) Int. Cl.
B62K 5/10 (2013.01)
B62K 5/06 (2006.01)
B62K 5/08 (2006.01)

(52) U.S. Cl.
CPC .................. B62K 5/10 (2013.01); B62K 5/06 (2013.01); B62K 5/08 (2013.01)

(58) Field of Classification Search
CPC ............... B62K 5/10; B62K 5/06; B62K 5/08
See application file for complete search history.

(56) References Cited

U.S. PATENT DOCUMENTS

| | | | | |
|---|---|---|---|---|
| 3,860,264 A * | 1/1975 | Douglas .................. | B62K 5/02 | |
| | | | 280/266 | |
| 5,209,506 A * | 5/1993 | Klopfenstein ........... | B62K 5/08 | |
| | | | 280/243 | |
| 6,666,469 B2 * | 12/2003 | Yu .......................... | B62K 13/00 | |
| | | | 280/274 | |
| 6,742,797 B2 * | 6/2004 | Lopez .................... | B62K 3/005 | |
| | | | 280/282 | |
| 10,131,397 B2 * | 11/2018 | Page ........................ | B62K 5/10 | |
| 2002/0047245 A1 * | 4/2002 | Greene, Jr. .............. | B62K 5/06 | |
| | | | 280/259 | |
| 2003/0042701 A1 * | 3/2003 | Chen ........................ | B62K 3/10 | |
| | | | 280/270 | |

* cited by examiner

*Primary Examiner* — Valentin Neacsu
*Assistant Examiner* — Marlon A Arce
(74) *Attorney, Agent, or Firm* — R. Ruschena Patent Agent, LLC

(57) ABSTRACT

A vehicle with pedals (100,200) for a rider comprising: a saddle (1); a front wheel (2); a supporting body (6) or a tubular frame (70); a pair of pedals (5, 5'); a pair of rear wheels (3, 3'); a steering mechanism (4, 50) integral to the supporting body (6) or the tubular frame (70). The mechanism (4, 50) is configured to oscillate and allow the inclination and the curvature of the wheels (3, 3') by means of the rider weight shifting.

11 Claims, 5 Drawing Sheets

TRYCICLE PEDAL VEHICLE

RELATED APPLICATIONS

This is a Continuation-In-Part of U.S. application Ser. No. 16/981,987, now abandoned.

U.S. application Ser. No. 16/981,987 was a U.S. National Stage Application of PCT application PCT/IB2019/052746 having an international filing Date of 4 Apr. 2019. This present application claims foreign priority based on application 102018000004264 of Italy, filed on 6 Apr. 2018.

BACKGROUND OF THE INVENTION

1. Field of the Invention

The present invention relates to an innovative vehicle with pedals, in particular a three-wheeled vehicle, particularly but not exclusively suitable for being transported and used in a city.

2. Brief Description of the Prior Art

As is known, there are many known vehicle with pedals used both for leisure and as a vehicle for usual moving around a city. Moreover, in the last few years, city transport has changed in favor of these environmentally-friendly and easily available means of transport.

These means of transport are above all the classic bicycles made available to users also by numerous Italian Municipalities, to be used instead of traditional means of transport (buses, trams and metro). However, the classic bicycle is not suitable for any type of user, for example for people with stability problems.

Also known for years and available on the market are foldable and transportable two-wheels means.

However, traditional vehicle with pedals are not easily transportable and even those that are commonly folded into different parts to make them comfortable to carry are often provided with extremely small wheels and are therefore difficult to use and require considerable pedaling effort.

There is therefore the need for an innovative pedestrian transport device that is extremely comfortable to drive and extremely compact, which overcomes the drawbacks of the known vehicle with pedals.

SUMMARY OF THE INVENTION

The purpose of the invention is to provide an innovative vehicle with pedals that is easy to use and suitable for any type of user, not indeed, it requires special driving or pedaling skills. To this aim the vehicle with pedals according to the invention is provided with a steering mechanism which allows the inclination and the curvature of the wheels just by means of user weight shifting.

Furthermore, said vehicles is extremely compact in its dimensions, both in length and in height, and therefore easily transportable.

Therefore, the present invention provides an innovative vehicle with pedals as specified in the appended independent claim.

The dependent claims outline particular and further advantageous aspects of the invention.

BRIEF DESCRIPTION OF THE DRAWINGS

The different ways of carrying out the invention will now be described, by means of examples, with reference to the annexed drawings in which.

DETAILED DESCRIPTION DETAILED DESCRIPTION OF THE PREFERRED EMBODIMENTS

Figures 1, 2:
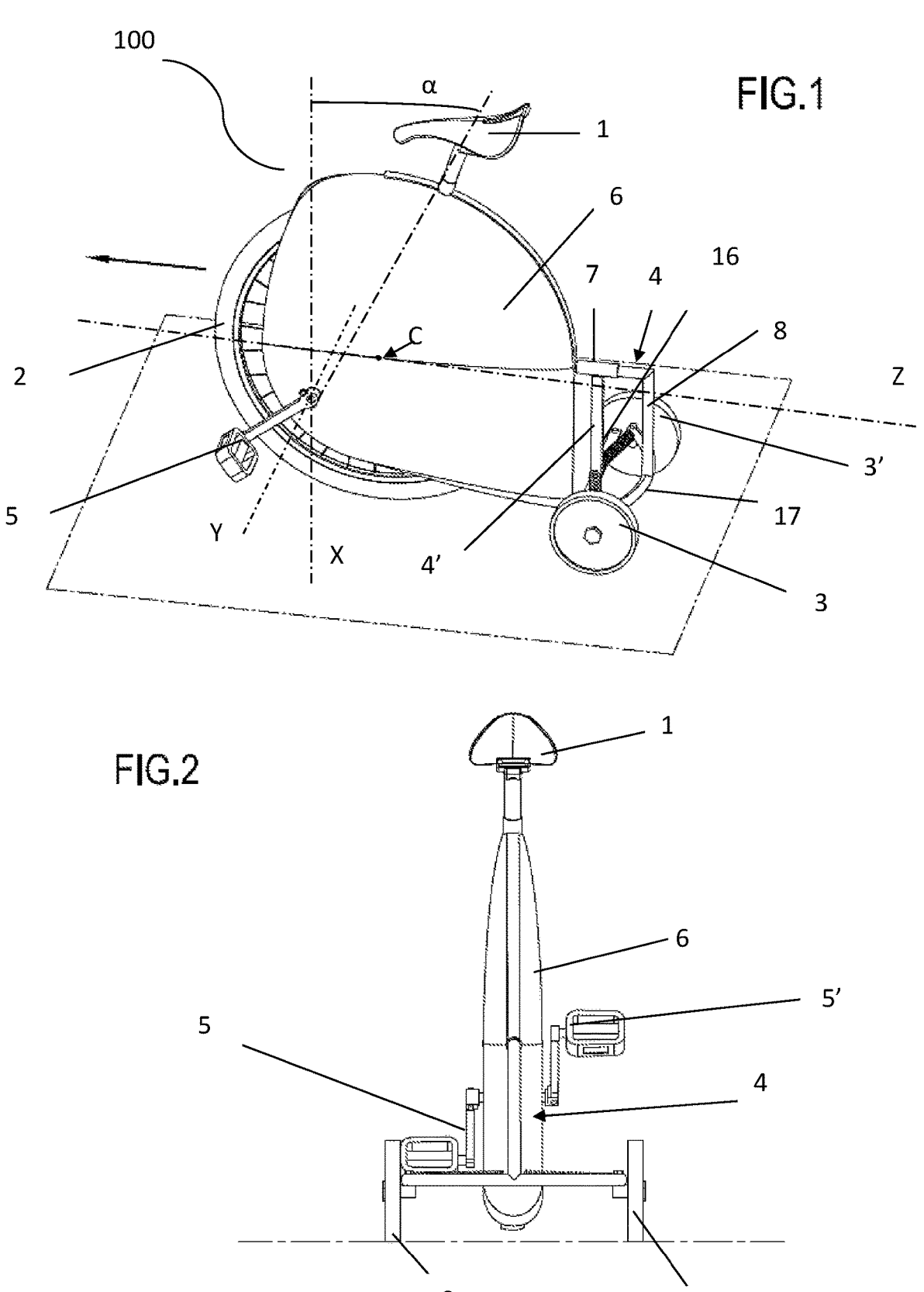
FIG. 1 shows a side perspective view of the vehicle with pedals, according to a first embodiment of the present invention.
FIG. 2 shows a rear view of the vehicle of FIG. 1.

With reference to the aforementioned figures, an innovative vehicle with pedals 100 is described. According to a first embodiment, the vehicle with pedals 100 comprises a saddle 1, a front wheel 2, a supporting body 6 which covers said front wheel 2, a pair of pedals 5, 5', a pair of rear wheels 3, 3' and a steering mechanism 4 for the connection between the front wheel 2 and the rear wheels 3,3'. The steering mechanism 4 allows the inclination and therefore the curvature of the wheels 3, 3' each of which steer on its own vertical axis and synchronously, consequently determining the steering of the vehicle with pedals 100. The supporting body 6 could be replaced by a frame.

According to this embodiment, the steering mechanism 4, which allows the easy steering of the vehicle with pedals 100 without the aid of the steering wheel or the use of the user's hands, establishes the connection between the supporting body 6 and the rear wheels 3, which can be inclined.

The steering mechanism 4 comprises:
a pipe 7 which is steadily fixed to the supporting body 6, so that, when the supporting body 6 oscillates due to the rider's weight shifting, said pipe 7 will oscillate too,
a rod 4' which is steadily fixed to the pipe 7. Consequently, the rod 4' will oscillate as well together with the pipe 7.

The steering mechanism 4 further comprises:
a horizontal rod 17 connecting the wheels 3, 3' which is stable in its horizontal configuration,
a vertical rod 8 connecting the horizontal rod 17 to the pipe 7. The vertical rod 8 is also stable in its vertical configuration,
a horizontal rib 16 connected to the rod 4'. Due to the oscillation of the rod 4', the horizontal rib 16 will execute alternate straight movements.

Said wheels 3, 3', are joined together by the horizontal rib 16 and by the horizontal rod 17.

Figures 3, 4:
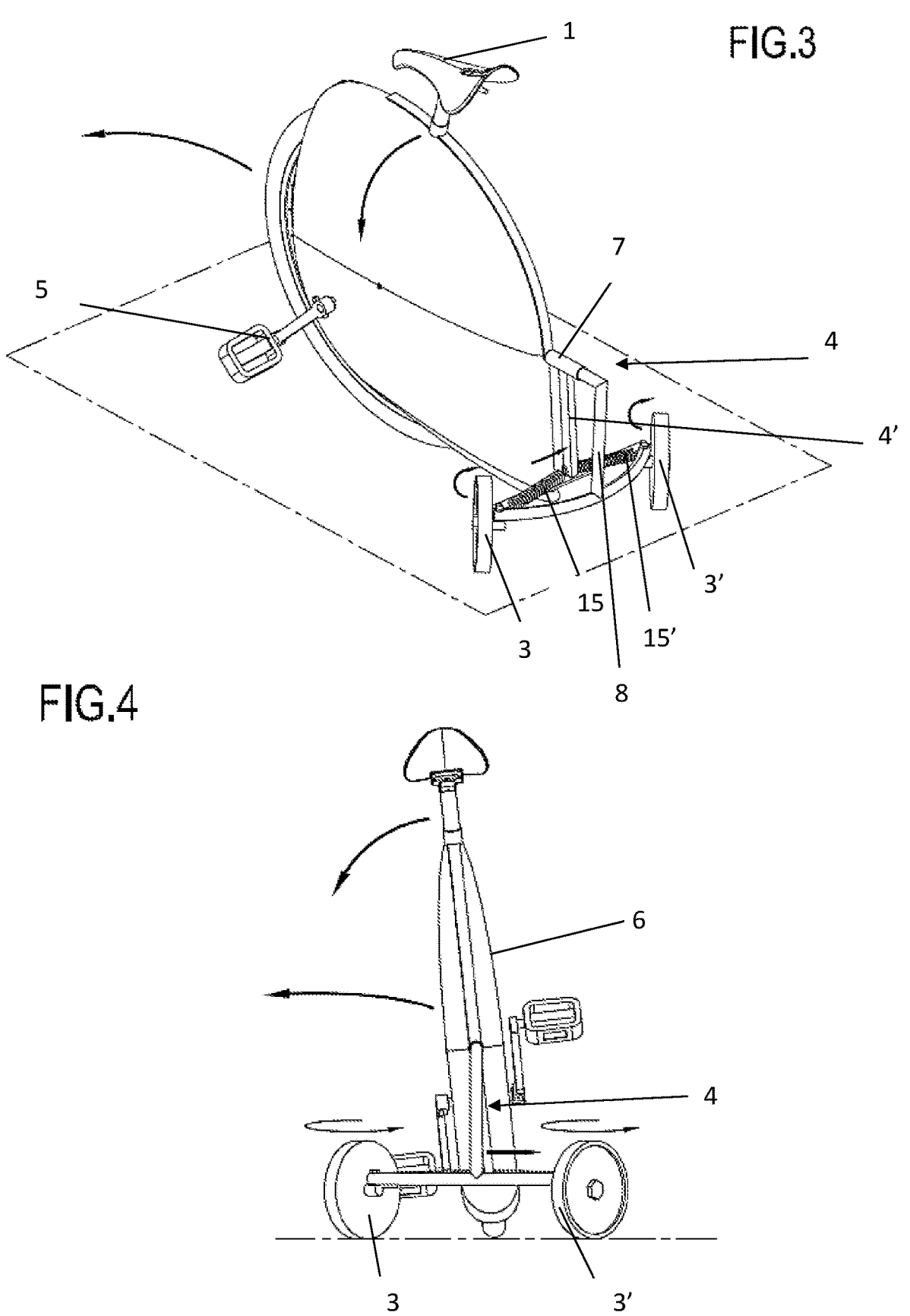
FIG. 3 shows a perspective view of the vehicle of FIG. 1 during operation, in particular during the steering phase.
FIG. 4 shows a rear view of the vehicle shown in FIG. 1, during operation, in particular during the steering phase.

The horizontal rib 16 is configured to achieve a minimum bulk, perform the steering function of the vehicle 100. At the same time the rigidity and balance of the vehicle with pedals 100 are guaranteed by the horizontal rod 17 of curvilinear shape and with concavity turned towards the supporting body 6 of the vehicle 100, also configured so as to achieve a minimum bulk. As shown in FIG. 3 and FIG. 4, to make the steering the user only needs to shift his weight to the right or left. In this way the front wheel 2 and the steering mechanism 4 integral with the supporting body 6 will be inclined first the front wheel 2 and the steering mechanism 4 integral with the supporting body 6.

Advantageously, the front wheel 2 oscillates along an axis Z passing through the center C of the front wheel 2 and through the rod 4' of the steering mechanism 4, therefore this axis Z is almost parallel to the ground.

Consequently, the steering mechanism 4 causes the wheels 3, 3' to rotate to the right or to the left around their vertical axis and synchronously, bringing the vehicle to perform the steering. In particular, the steering mechanism 4 comprises the rod 4', which is pivoted passively on the horizontal rib 16 and therefore this rod 4' acts as a cursor, which will push the horizontal rib 16 to the right or to the left according to the inclination of the supporting body 6 and the user. This movement of the horizontal rib 16 will therefore cause the rotation of the rear wheels 3, 3' along their vertical axis and synchronously with each other, and consequently with steering of the vehicle with pedals 100.

Elastic means 15, 15', for example helical springs, are fixed on a first end to the horizontal rod 17, so that this first end is a fixed point and on a second end to the rod 4', so that this second end is a movable end. When the vehicle with pedals 100 moves straight, the elastic forces due to the elastic means are equal and opposed, so that the rod 4' is in equilibrium along the vertical direction. During steering, the movement of the rod 4' toward left or right (due to the rider weight shifting) unbalances the elastic forces. Consequently, the elastic means 15, 15' will bring back the rod 4' in its vertical position, as soon as the rider (willing to go straight again) will not shift his weight anymore. Therefore, the elastic means 15, 15' are positioned along the horizontal rib 16 and guarantee the stability of vehicle with pedals 100 both from standstill and in movement, both during movement straight, both during steering phases.

Advantageously, in order to obtain a greater compactness of the vehicle with pedals 100 the overall dimensions of the rear wheels 3, 3' are reduced thanks to the fact that the three wheels are partially side by side. In particular, there is a partial overlap in the axial direction of the rear wheels 3, 3' with the front wheel 2. These features allow to obtain an overall length of vehicle with pedals 100 extremely contained.

Furthermore, the presence of three wheels means that the vehicle in question remains in balance by itself, both when used and when it is left standing. It is therefore not necessary nor an additional support, such as a tripod, nor is there a need for the user to place his feet on the ground during periods of rest, for example at a traffic light. The guide of this vehicle is therefore very simple and intuitive and does not require any particular agility or commitment in the guide.

Advantageously, in fact, the rotation of the rear wheels 3, 3' by means of the steering mechanism 4 allows the user to make turns and steers without the aid of the hands, which are free during pedaling. Therefore, this vehicle with pedals 100 is devoid of the steering wheel.

The front wheel 2 is of the standard type, as for common bicycles, for example a 28-inch wheel 700 mm in diameter, on which is mounted the load-supporting body 6 which completely covers the rear part of the wheel 2 and leaves the front part, in this way, in case of impact, the body 6 is not damaged. Said specific shape of the supporting body 6 also has the function of a mudguard and a protection for the user. In an alternative embodiment, this supporting body 6 also covers the rear wheels 3, 3'.

Advantageously, since the front wheel 2 is of large dimensions, with respect to the wheels of the known pedal means, it allows to face obstacles such as holes, sidewalks, etc.

Having adopted the solution of the front wheel 2 of the standard type, in order to make the present vehicle with pedals compact in length, the saddle 1 is constrained on the upper part of the supporting body 6. Furthermore, the saddle 1 is located in a rearward position with respect to the pedals 5, 5' and to a vertical axis X passing through the center point of a horizontal segment Y, joining the pedals 5, 5' themselves.

To reduce also the overall dimensions, the seat is low, slightly higher than the user's inseam. In addition, a lower center of gravity facilitates pedaling and the balance of the user himself, but, in any case, the saddle 1 is adjustable in height.

Still for the purpose of reducing the overall dimensions, the pedals 5, 5' are also mounted on the supporting body 6 in an eccentric position with respect to the center C of the front wheel 2 (FIG. 1). More precisely, the pedals are mounted in the front and lower part (i.e., towards the ground) of the supporting body 6 so that the user, sitting on the saddle 1, can comfortably and with greater balance operate the pedals. Advantageously, to make pedaling more comfortable, the saddle 1 is inclined with respect to the X axis passing through the center of the Y segment of the pedals 5, 5' of an angle α comprised in a range between 15° and 35°.

Figures 5A, 5B:
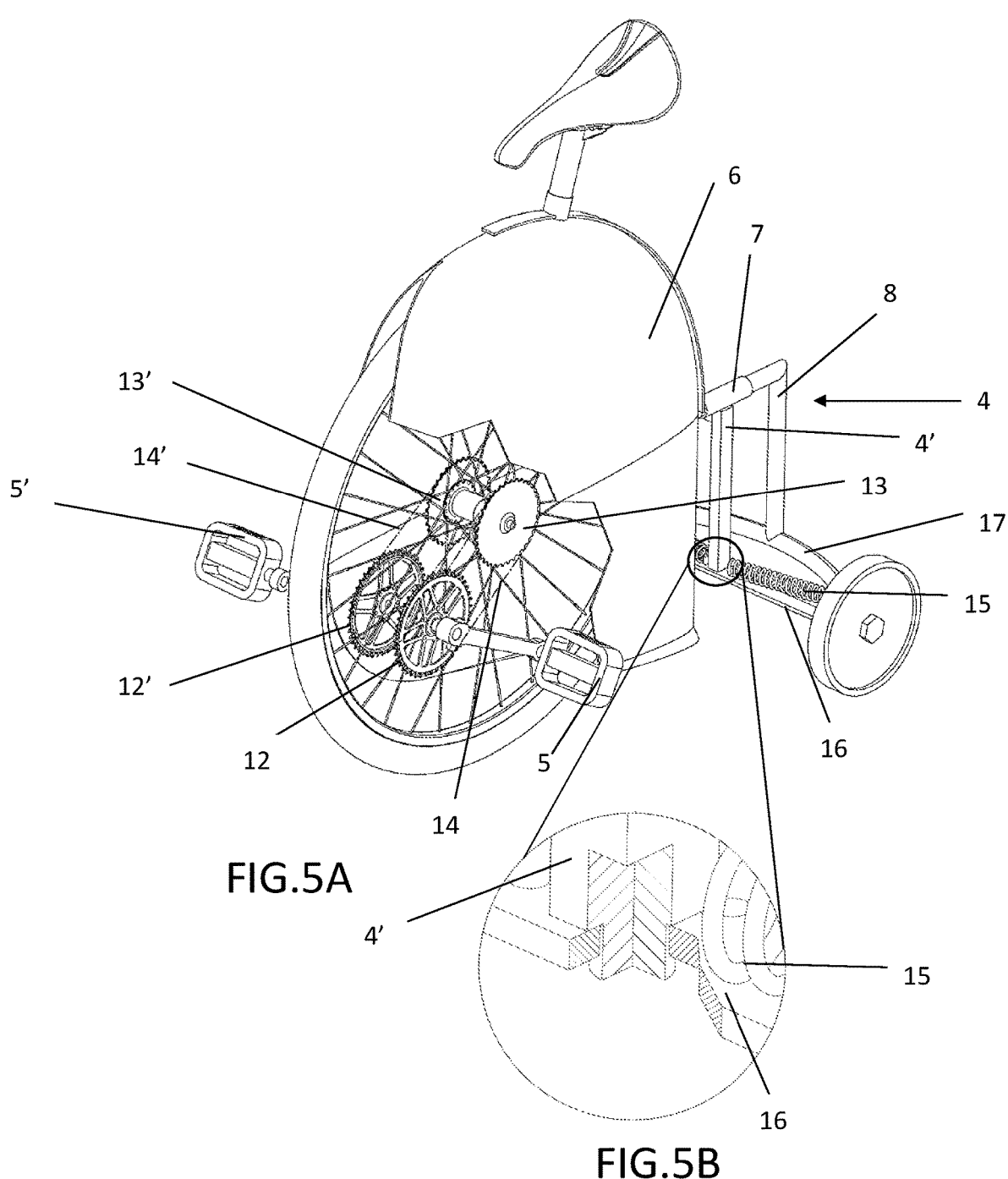
FIG. 5A shows a perspective view of the vehicle shown in FIG. 1 with a detail of the internal components.
FIG. 5B shows a cutaway view of a detail of the rear steering mechanism of the vehicle shown in FIG. 1.

As shown in FIG. 5A, the kinematics, i.e., the movement of the components of the vehicle with pedals 100, which transmits the power from the legs of the user to the wheel 2, is positioned symmetrically with respect to the front wheel 2 itself. The kinematics includes the pedals 5, 5' integral respectively with a toothed crown 12, 12' and a pair of pinions 13, 13' connected to the respective toothed crowns 12, 12' each through a chain 14, 14'. The pair of pinions 13, 13' is positioned at the axis of the front wheel 2. Crown 12, 12' and pinion 13, 13' respectively on each side of the wheel 2 on which they are positioned, are separated from each other to obtain a smaller footprint and to lower the wheel's center of gravity.

Furthermore, the pedals 5, 5' are not bound to each other, i.e., there is no connection between them inside the front wheel 2, otherwise this connection would hinder the movement of the spokes of the wheel itself.

The toothed crown 12, 12' is for example of the type with 24 teeth with a diameter of about 100 mm, the pinion 13, 13' is for example with 16 teeth with a diameter of about 75 mm.

Advantageously, the dimensions of the crown and pinion may vary, for example to make pedaling easier in places where there are many climbs.

As in traditional bicycles, the kinematic chain ends with the wheel: it transmits the driving torque to the ground and this creates the movement of the vehicle with pedals. In an alternative solution of the present invention, there is also a chain tensioner located on the loose branch of the chain, the lower one.

Figure 6:
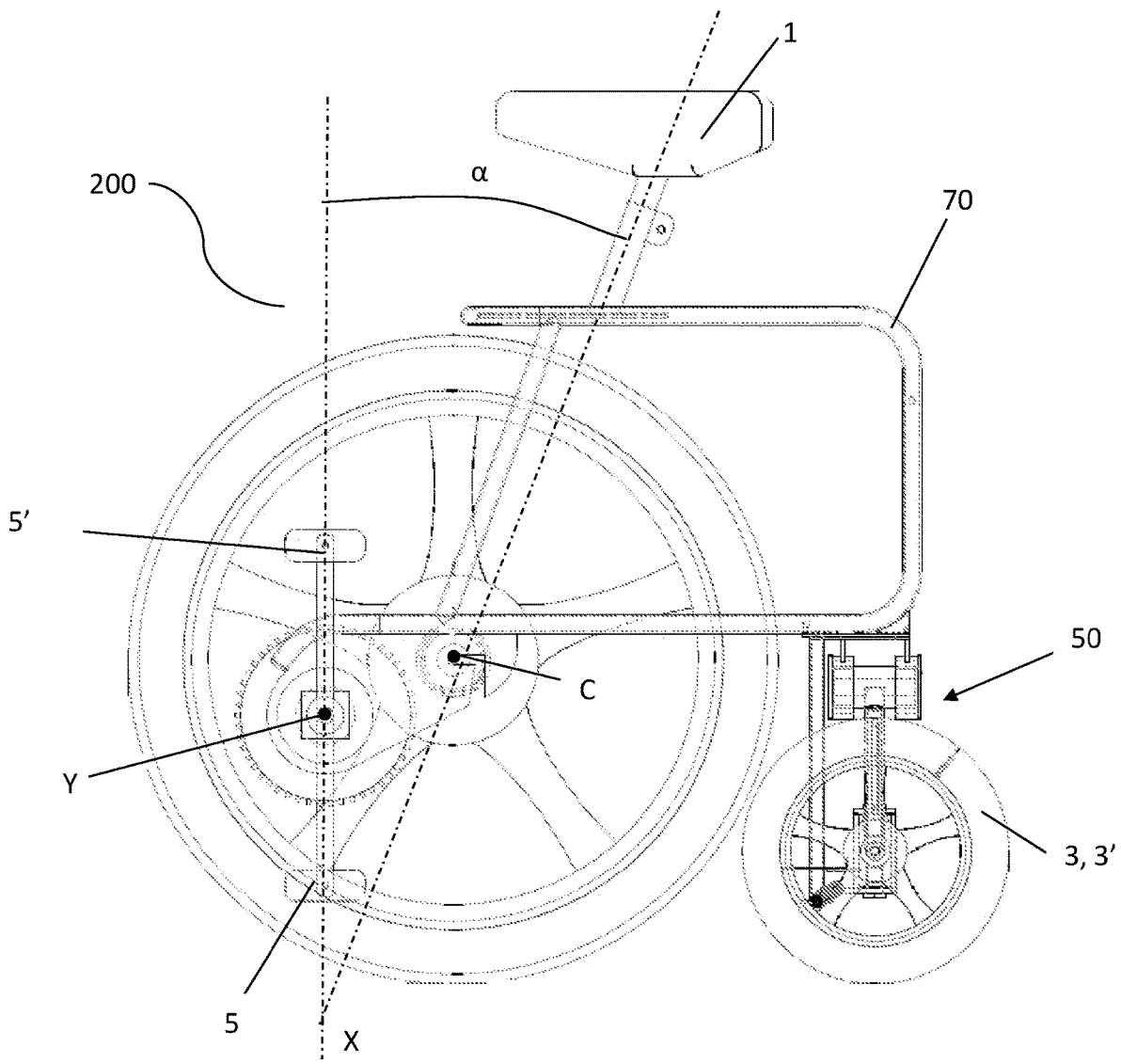
FIG. 6 shows a lateral view of the vehicle with pedals, according to a further embodiment of the present invention.
Figures 7, 8:
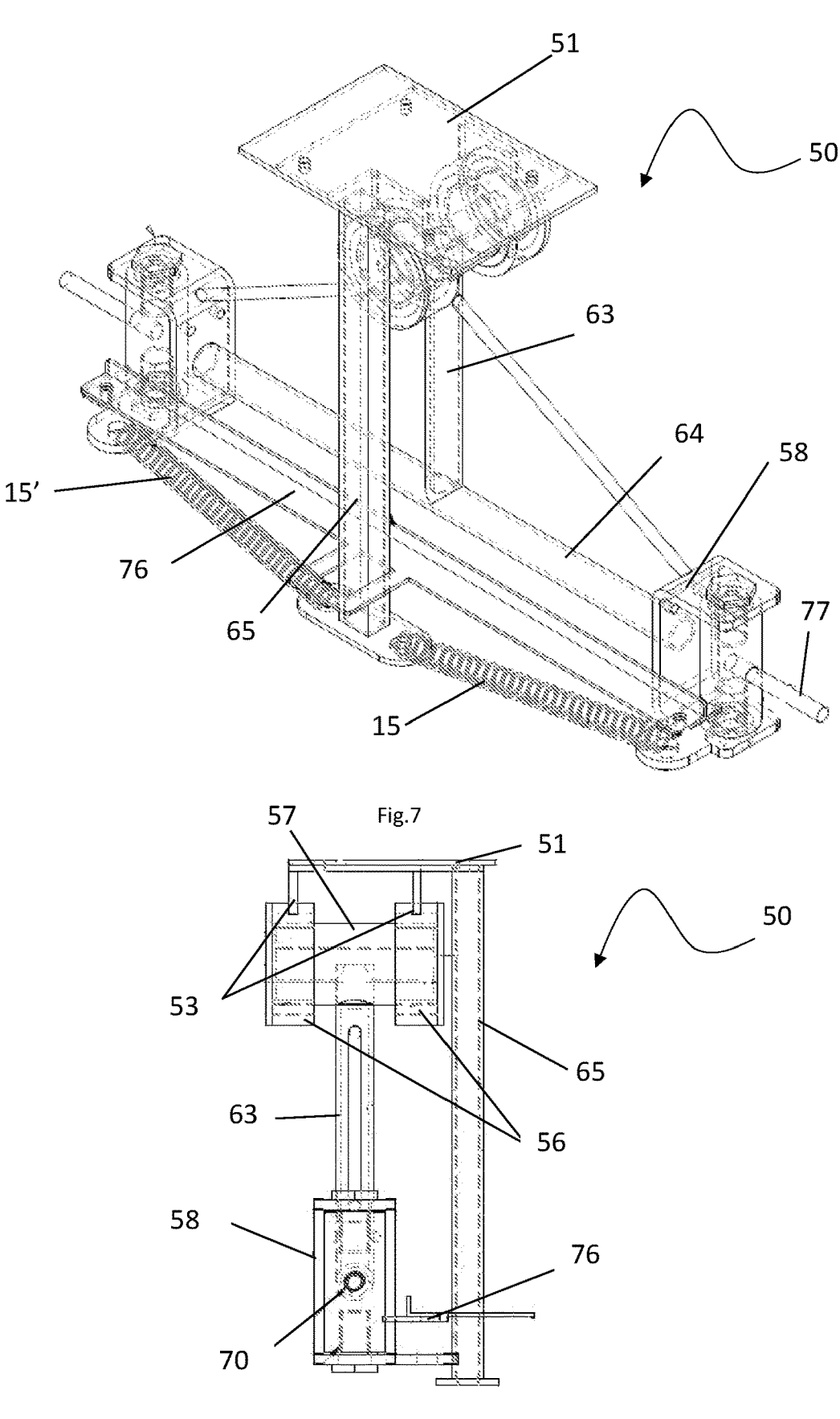
FIG. 7 shows a perspective view of a steering mechanism of the vehicle of FIG. 6.
FIG. 8 shows a side view of the steering mechanism of the FIG. 7.

FIG. 6 to FIG. 8 show a further embodiment of the present invention. The vehicle with pedals 200 comprises a saddle 1, a front wheel 2, a tubular frame 70, a pair of pedals 5, 5', a pair of rear wheels 3, 3' and a steering mechanism 50 for the connection between the front wheel 2 and the rear wheels 3,3'. The steering mechanism 50 allows the inclination and therefore the curvature of the wheels 3, 3' each of which steer on its own vertical axis and synchronously, consequently determining the steering of the vehicle with pedals 200.

According to said further embodiment, the steering mechanism 50, which allows the easy steering of the vehicle with pedals 200 without the aid of the steering wheel or the use of the rider's hands, establishes the connection between the tubular frame 70 and the rear wheels 3, which can be inclined.

The steering mechanism 50 comprises:

a plate 51 which is steadily fixed to the tubular frame 70, so that, when the tubular frame 70 oscillates due to the rider's weight shifting, said plate 51 will oscillate too, two sliding bearings 56 which are steadily fixed to the plate 51 by means of two small rods 53, a hollow pipe 54 which is supported by the two sliding bearings 56, an arm 65 which is steadily fixed to the plate 51.

Consequently, the two sliding bearings 56, the hollow pipe 54 and the arm 65 will oscillate as well together with the plate 51.

The steering mechanism 50 further comprises:

a horizontal rod 64 connecting the wheels 3, 3' which is stable in its horizontal configuration, a vertical rod 63 connecting the horizontal rod 64 to the hollow pipe 54 by means to a hinge coupling 57. Also the vertical rod 63 is stable in its vertical configuration, wherein the hollow pipe 54 could oscillate due to the hinge coupling 57, a horizontal rib 76 connected to the arm 65. Due to the oscillation of the arm 65, the horizontal rib 76 will execute alternate straight movements.

Therefore, to execute the steering, also according to this embodiment, the user only needs to shift his weight to the right or to the left. In this way the front wheel 2 and the steering mechanism 50 integral with the supporting tubular frame 70 will be inclined.

This inclination caused by the oscillation of the vehicle with pedals 200 will create the steering through the horizontal rib 76 which acts on the rotation axis 70 of the wheels 3, 3'.

Elastic means 15, 15', for example two helical springs having same geometry and same rigidity, are fixed on a first end to a fixed structure 58 connected to the horizontal rod 64, so that this first end of the elastic means is a fixed point, and on a second end to the arm 65, so that this second end is a movable point. When the vehicle with pedals 200 moves straight, the elastic forces due to the elastic means are equal and opposed, so that the arm 65 is in equilibrium along the vertical direction. During steering, the movement of the arm 65 toward left or right (due to the rider weight shifting) unbalances the elastic forces. Consequently, the elastic means 15, 15' will bring back the arm 65 in its vertical position as soon as the rider (willing to go straight again) will not shift his weight anymore. Therefore, the elastic means 15, 15' guarantee the stability of vehicle with pedals 200 both from standstill and in movement, both during movement straight, both during steering phases. In fact, this way the elastic means 15, 15' will always keep the vehicle with pedals 200 in a vertical position respect to the floor and consequently the vehicle with pedals 200 will always tend to go straight if the user does not shift his weight to have a change of direction.

As a function of the hardness and length of the elastic means, the vehicle with pedals will be more stable or more manageable, also depending on the height and weight of the user.

Advantageously, in fact, the rotation of the rear wheels 3, 3' by means of the steering mechanism 50 allows the user to make turns and steers without the aid of the hands, which are free during pedaling. Therefore, this vehicle with pedals 200 is devoid of the steering wheel.

As for the previous embodiment, in order to obtain a greater compactness of the vehicle with pedals 200 the overall dimensions of the rear wheels 3, 3' are reduced. These features allow to obtain an overall length of vehicle with pedals 200 extremely contained.

Furthermore, the presence of three wheels means that the vehicle in question remains in balance by itself, both when used and when it is left standing. It is therefore not necessary nor an additional support, such as a tripod, nor is there a need for the user to place his feet on the ground during periods of rest, for example at a traffic light. The guide of this vehicle is therefore very simple and intuitive and does not require any particular agility or commitment in the guide.

The front wheel 2 is of the standard type, as for common bicycles, for example a 28-inch wheel 700 mm in diameter.

Advantageously, since the front wheel 2 is of large dimensions, with respect to the wheels of the known pedal means, it allows to face obstacles such as holes, sidewalks, etc.

Having adopted the solution of the front wheel 2 of the standard type, in order to make the present vehicle with pedals compact in length, the saddle 1 is constrained on the upper part of the tubular frame 70. Furthermore, the saddle 1 is located in a rearward position with respect to the pedals 5, 5' and to a vertical axis X passing through the center point of a horizontal segment Y, joining the pedals 5, 5' themselves.

To reduce also the overall dimensions, the seat is low, slightly higher than the user's inseam. In addition, a lower center of gravity facilitates pedaling and the balance of the user himself, but in any case the saddle 1 is adjustable in height.

Still for the purpose of reducing the overall dimensions, the pedals 5, 5' are also mounted on the tubular frame 70 in an eccentric position with respect to the center C of the front wheel 2 (FIG. 6). More precisely, the pedals are mounted in the front and lower part (i.e. towards the ground) of the tubular frame 70 so that the user, sitting on the saddle 1, can comfortably and with greater balance operate the pedals. Advantageously, to make pedaling more comfortable, the saddle 1 is inclined with respect to the X axis passing through the center of the Y segment of the pedals 5, 5' of an angle α comprised in a range between 15° and 35°.

The kinematics, i.e. the movement of the components of the vehicle with pedals 200, is the same described in the first embodiment of the present invention.

Advantageously, the rear wheels 3,3' have a significantly smaller size than the front wheel 2, for example of 180 mm in diameter, and are at a distance such as to allow at the same time an easy pedaling and a high compactness of the vehicle subject of the present invention. The wheelbase of the rear wheels 3, 3' has a length of about 400 mm.

The means of transport 100,200 as subject-matter, has very small dimensions and is included in a range of about 70-85 cm of length, 35-50 cm of width and 70-90 cm of height and consequently also has a limited, variable weight between a minimum of 5 kg and a maximum of 15 kg. The height can also vary depending on the height and type of user, depending on whether the latter is a man, woman or child.

These features allow an easy transport, and use everywhere, for example in the elevator, train, bus, car etc. . . .

In an alternative configuration of the present invention, the means according to the present invention can also be realized with pedal assistance. Furthermore, the front wheel can advantageously be fixed or free-wheel.

These last two configurations (freewheel or pedal assisted) would also be equipped with a braking system which, in an alternative configuration of the present invention comprises brakes positioned on the rear wheels 3, 3' connected to the seat 1 by means of a backrest which is operated in the moment of need it acts on the rear wheels for braking.

Advantageously, the means in question may comprise a cart for transporting a person both seated and standing, and front and rear spotlights.

Furthermore, connected to the supporting body 6 could be connected a coupling system of the means to a pole, to avoid theft.

Advantageously, as already mentioned, the means of the present invention does not require the use of hands (because there is no handlebar), so during its use the user has his hands completely free, for example to hold an umbrella, to speak to the telephone, store, etc. There are also no handle-bars or handles in front of the user seated on the saddle 1, so in case of need or in case of rapid descent, this is in no way obstructed.

Furthermore, it must be understood that the realization or the presented embodiments are just examples which do not intend to limit in any way the scope of protection of the invention or its application or its configurations. On the contrary, the summary and the detailed description provide the person skilled in the art of a convenient guide for industrial implementation of at least one exemplary embodi-ment, being evident that numerous variations can be made regarding function and assembly of the elements described herein, without departing from the scope of protection of the invention as established by the appended claims and their technical-legal equivalents.

The invention claimed is:

1. A vehicle with pedals (100, 200) comprising:
a saddle (1);
a front wheel (2);
a supporting body (6) or a tubular frame (70);
a pair of rear wheels (3, 3');
a kinematic mechanism positioned on the front wheel (2) and comprises a pair of pedals (5, 5'), each of them integral with a toothed crown (12, 12') and a pair of pinions (13, 13') connected to the respective toothed crowns (12, 12') by means of a chain (14, 14');
a steering mechanism (4, 50) integral to the supporting body (6) or the tubular frame (70),
wherein said steering mechanism (4, 50) is configured to oscillate and allow an inclination and a curvature of the rear wheels (3, 3').

2. The vehicle with pedals (200) according to claim 1, wherein said steering mechanism (50) comprises:
a plate (51) which is steadily fixed to the tubular frame (70), so that, when the tubular frame (70) oscillates, said plate (51) will oscillate too, two sliding bearings (56) which are steadily fixed to the plate (51) by means of two small rods (53),
a hollow pipe (54) which is supported by the two sliding bearings (56),
an arm (65) which is steadily fixed to the plate (51),
a horizontal rod (64) connecting the rear wheels (3, 3') which is stable in its horizontal configuration,
a vertical rod (63) connecting the horizontal rod (64) to the hollow pipe (54) by means to a hinge coupling (57),
a horizontal rib (76) connected to the arm (65) and acting on a rotation axis (77) of the rear wheels (3, 3').

3. The vehicle with pedals (100) according to claim 2, wherein elastic means (15, 15') are fixed on one end to a fixed structure (58) connected to the horizontal rod (64) and on the other end to the arm (65).

4. The vehicle with pedals (100) according to claim 1, wherein the steering mechanism (4) comprises a rod (4') pivoted through a horizontal rib (16) and configured as a cursor to move the horizontal rib (16) to the right or to the left depending on the inclination of the supporting body (6) causing the rotation of the rear wheels (3, 3') along their vertical axis and synchronously with each other.

5. The vehicle with pedals (100) according to claim 4, wherein said steering mechanism (4) comprises elastic means (15, 15') fixed on a first end to an horizontal rod (17) and on a second end to the rod (4').

6. The vehicle with pedals (100) according to claim 5, wherein said rear wheels (3, 3') are connected to each other by the horizontal rod (17) configured to guarantee stability and balance at the vehicle with pedals (100).

7. The vehicle with pedals (100, 200) according to claim 1, wherein said saddle (1) is steadily connected to the upper part of the supporting body (6) or the tubular frame (70) in a rearward position with respect to a vertical axis (X) passing through the center of a horizontal segment (Y), connecting the pedals (5, 5').

8. The vehicle with pedals (100, 200) according to claim 1, wherein said saddle (1) is inclined with respect to the vertical axis (X) passing through the center of the horizontal segment (Y), of an angle ($\alpha$) comprised in a range between 15° and 35°.

9. The vehicle with pedals (100,200) according to claim 1, wherein said pedals (5, 5') are mounted on the supporting body (6) or the tubular frame (70) in an eccentric position with respect to the center (C) of the front wheel (2).

10. The vehicle with pedals (100, 200) according to claim 1, wherein said toothed crown (12, 12') has twenty-four teeth with a diameter of approximately 100 mm, and said pinion (13, 13') has sixteen teeth with a diameter of approximately 75 mm.

11. The vehicle with pedals (100, 200) according to claim 1, characterized by a length ranging from about 70 to 85 cm, a width of between about 35-50 cm and a height of between 70 and 90 cm.

* * * * *